(12) United States Patent
Engelfried et al.

(10) Patent No.: US 7,103,441 B2
(45) Date of Patent: Sep. 5, 2006

(54) CALIBRATION PROCEDURES AND SUCH USING AN EROSION AND GRINDING MACHINE

(75) Inventors: Thomas Engelfried, Baltmannsweiler (DE); Heinz Häckh, Aichwald (DE); Christian Dilger, Ditzingen (DE)

(73) Assignee: Walter Maschinenbau GmbH, Tubingen (DE)

( * ) Notice: Subject to any disclaimer, the term of this patent is extended or adjusted under 35 U.S.C. 154(b) by 1 day.

(21) Appl. No.: 10/957,634

(22) Filed: Oct. 5, 2004

(65) Prior Publication Data

US 2006/0074511 A1 Apr. 6, 2006

(51) Int. Cl.
*G06F 19/00* (2006.01)

(52) U.S. Cl. ............... 700/161; 700/164; 700/193; 451/5

(58) Field of Classification Search ............... 700/159, 700/161, 164, 176, 192, 193, 254; 451/5, 451/9–11, 1; 33/504; 318/570, 572
See application file for complete search history.

(56) References Cited

U.S. PATENT DOCUMENTS

| | | | |
|---|---|---|---|
| 4,928,437 A | | 5/1990 | Waelti |
| 5,738,564 A | * | 4/1998 | Helle et al. ............ 451/11 |
| 5,773,731 A | * | 6/1998 | Sakakura et al. ......... 73/865.8 |
| 6,071,176 A | * | 6/2000 | Kruis ..................... 451/5 |
| 6,224,462 B1 | * | 5/2001 | Yokoyama et al. ....... 451/10 |
| 6,575,812 B1 | * | 6/2003 | Wirz ..................... 451/9 |
| 6,592,430 B1 | * | 7/2003 | Nakasuji et al. .......... 451/9 |

FOREIGN PATENT DOCUMENTS

| | | |
|---|---|---|
| DE | 40 30 185 | 3/1992 |
| DE | 43 01 486 | 3/1994 |
| WO | WO 2004/069471 | 8/2004 |

* cited by examiner

*Primary Examiner*—Leo Picard
*Assistant Examiner*—Alexander Kosowski
(74) *Attorney, Agent, or Firm*—Drinker Biddle & Reath LLP

(57) ABSTRACT

A method for calibration of grinding and/or erosion machines assumes an initial calibration process and corresponding re-calibration processes. Calibration of the machine is performed with a reference piece and a reference tracer in an initial calibration process. Grinding tests follow the first tracing process from all directions during which tests deviations are determined and made ineffective with the iterative procedure. The machine-internal measuring system is calibrated immediately after performing the machining tests and thereby immediately after the initial referencing of the machining apparatus whereby the machine tracer and a test piece is traced from all coordinate directions and the resulting position values are stored. Subsequent re-calibrations supply measured values, which are compared to the stored values whereby correction values are determined then from the deviations for additional machining of workpieces.

8 Claims, 3 Drawing Sheets

CALIBRATION PROCEDURES AND SUCH USING AN EROSION AND GRINDING MACHINE

BACKGROUND

The invention relates to a method for calibration and re-calibration of a grinding machine, an erosion machine, or a combined grinding and erosion machine, as well as a machine with which to realize such a method.

Grinding machines and/or erosion machines are employed in tool fabrication, for example, to produce tools with high precision. Increasingly high demands are placed on precision machining. This precision in machining has to be guaranteed not only in individual cases but also in series production over a long period. This requires careful calibration and control of the respective machine. The calibration is to remain effective over a long period and it is to be performed in a simple manner.

It is therefore the object of the invention to provide a calibration method for a grinding machine or an erosion machine with which precision machining of tools can be guaranteed over a long period. It is furthermore the object of the invention to provide a machine to realize such a method.

SUMMARY OF INVENTION

This object is achieved by a method for the calibration of a workpiece shaping machine, such as a grinding machine, an eroding machine, or a combined grinding and eroding machine. The machine comprises a spindle carrier which carries a spindle, a workpiece carrier which has a receiver for carrying a workpiece, and a control mechanism for producing relative movement between the spindle carrier and the workpiece carrier, so that the spindle carrier and the workpiece carrier can be moved toward and away from one another, and so that the orientation of respective axes of the spindle carrier and the workpiece carrier relative to one another can be changed. The method comprises the steps of:

A) perfoming an initial calibration between the spindle carrier and the workpiece carrier employing first calibration elements mounted on the spindle and the receiver, respectively, and thereafter B) subsequent to step A, performing periodic recalibrations between the spindle carrier and the workpiece carrier by tracing a test piece with a machine tracer. The spindle carrier carries one of the test piece and the machine tracer at a location spaced from the spindle. The work piece carrier carries the other of the test piece and the machine tracer at a location spaced from the receiver.

The inventive method is based on the fact that the respective machine performs re-calibrations from time to time after the initial calibration whereby the initial calibration is performed with a reference tracer and re-calibration is performed with a machine tracer. The calibration values obtained with the machine tracer in the re-calibration method represent a correction data, which is stored and used by the machine control programs in the subsequent grinding or erosion process to correct axial movement of the grinding machine or the erosion machine. Re-calibration can be performed automatically from time to time according to need and this re-calibration leads therefore back in its precision to the initial calibration. The initial calibration is preferably performed with the use of a reference tracer which is attached to the workpiece carrier. A reference body, i.e. a reference disk, is attached to the working spindle instead of being attached to the erosion or grinding tool.

Once this has been completed, then the reference body is traced several times by the reference tracer. At least one tracing process is thereby performed preferably for each coordinate direction X, Y, Z, respectively, which corresponds to the adjustment direction of the respective positioning devices acting upon the workpiece carrier or the working spindle carrier, for example. An initial measured value is thereby obtained for each coordinate direction. In particular, the measured values are obtained whereby the position values are taken into account together with the known dimension of the reference disk and the reference tracer and whereby said position values are supplied by the adjustment devices assigned to the individual coordinates. However, the thereby obtained measured values are only a first approximation because the switch point of the preferably switching reference tracer is not exactly known as a rule. A switch point of the tracer is at first assumed arbitrarily for the computation and a first correction value $\Delta x$, $\Delta y$, $\Delta z$ is computed for all coordinates under the prerequisite of this assumption and taken into account in this computation are the dimensions of the disk and the tracer as well as the coordinate values of the adjustment elements. This correction value is to express faulty positioning which is caused in each coordinate direction by structural inaccuracies of the machine stand, the guide elements, and through thermal changes or the like. The correction values are stored in the control device or in an associated memory unit.

A grinding test is now performed in a second step in which the stored correction values are used for the correction-control command of the adjustment device. Said values are added properly in sign to the coordinate directions predetermined for the grinding test. A test piece undergoes slight grinding several times during the grinding test, particularly from two directions for each coordinate to be checked. The ground sections are small facets that are ground into the surface of the test piece. Two ground test section belonging to the same coordinate and they are ground from different coordinate directions (i.e. +x and −x) and the associated facets are arranged thereby adjacent to one another. The positioning error between +x and −x can be determined from the size difference. A positioning error does not exist if both facets are equal in size. If the facets are different in size, then a correction value $\Delta x$, $\Delta y$, $\Delta z$ is derived from the difference in size and it is stored then in the control device or the memory unit. A second grinding test follows, which is again evaluated in the same way. This iteration is repeated until facets of equal size are ground in the respective coordinate direction. As a rule, it is sufficient to perform the iteration process for a single coordinate, i.e. coordinate X. This applies at least when the employed reference tracer has the same switch point location in all radial directions for a lateral deflection of its tracer pin. The tracer correction values obtained for the coordinate X (or the other coordinate selected respectively) can then be used for the other remaining coordinates as well.

Once the grinding machine or the erosion machine has received its first calibration in this manner, then the first re-calibration occurs immediately in a timely sequence whereby the test piece in the machine is brought into contact with the machine tracer in the machine. The correction values $\Delta x_n$, $\Delta y_n$, $\Delta z_n$ obtained through this tracing test are now stored. They show the measured deviation of the machine tracer compared to the reference tracer. Subsequent re-calibration processes are measured against these correction values obtained in the initial calibration. For example, if the values $\Delta x_s$, $\Delta y_s$, $\Delta z_s$ for the three coordinate directions X, Y, Z deviate from $\Delta x_n$, $\Delta y_n$, $\Delta z_n$, then these deviations represent a dimension change of the machine caused by a change in temperature, for example, and said deviations are taken into consideration in further machining.

It is seen to be advantageous to use the reference tracer at least two times or at least in one coordinate direction. Said reference tracer is thereby preferably used and switched once in its longitudinal direction and once in its transverse direction. The pivot of the tracer pin can be computed from the two tracing tests, which is of significance for the subsequent processing of measured values.

The second part of the aforementioned object is achieved by a machine provided with a test piece and a machine tracer whereby one of these elements is attached to the working spindle carrier and the other element is respectively attached to the workpiece carrier. The machine is additionally provided with a control device having the corresponding control software, which can carry out the calibration process in one calibration modus with one reference tracer and the described re-calibration process in one re-calibration modus with the corresponding machine tracer. The control software processes the above-mentioned steps whereby it requests input data from the operator during the calibration process (initial calibration). In the simplest case, the input data can be assessed values for the deviation in dimension $\Delta x$, which is the result of the difference in size of the facets created in step 2. The machine adjustment specialist must supply hereby a reasonably assessed value. However, it is also possible to place an assessment module in the control software which can determine the correction value $\Delta x$ (or $\Delta y$ or $\Delta z$) from the size difference of the facets. The assessment module is based thereby on the assumption that there is a tendency that a larger correction value $\Delta x$ is to be assigned to a larger size difference between the facets. In the simplest case, a proportional relationship is assumed and used as a basis.

BRIEF DESCRIPTION OF INVENTION

Additional details of advantageous embodiments of the invention are shown in the drawings, the description, as well as in the claims. An embodiment example of the invention is illustrated in the drawings.

Figure 10:
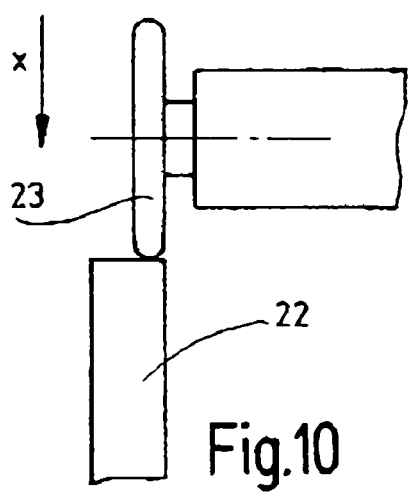
Figure 11:
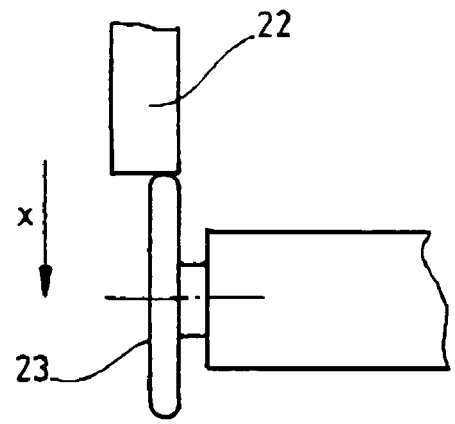
Figure 12:
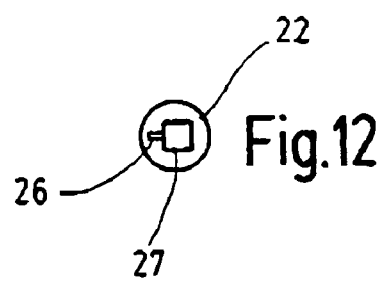
Figure 13:
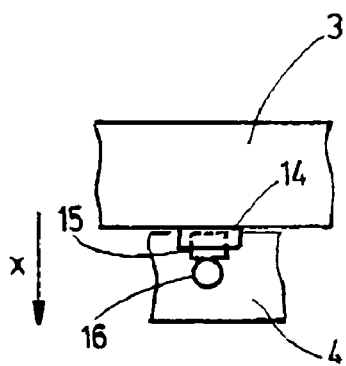
Figure 15:
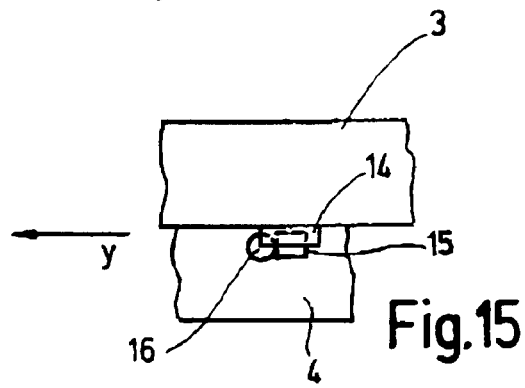
Figure 14:
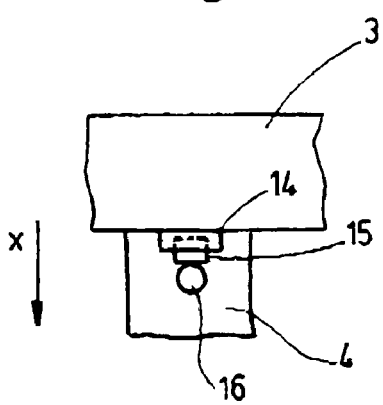
Figure 16:
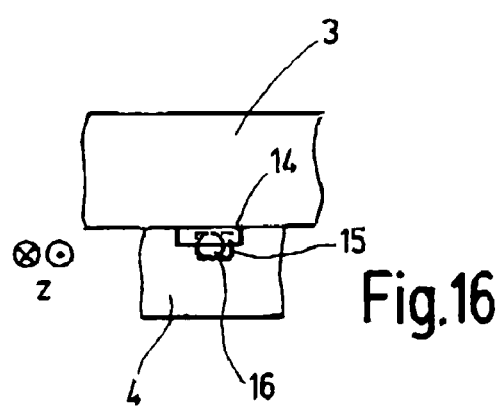

FIG. 10 and FIG. 11 respectively show in an extremely schematic top views the grinding head together with a grinding tool and the unfinished piece in different grinding positions during a grinding process;

FIG. 12 shows in a schematic front view the unfinished piece after completion of the grinding process according to FIG. 10 and FIG. 11.

FIGS. 13 through 16 show, in schematic top views, respective steps performed to calibrate the machine tracer.

DETAILED DESCRIPTION OF PREFERRED EMBODIMENTS

Figure 1:
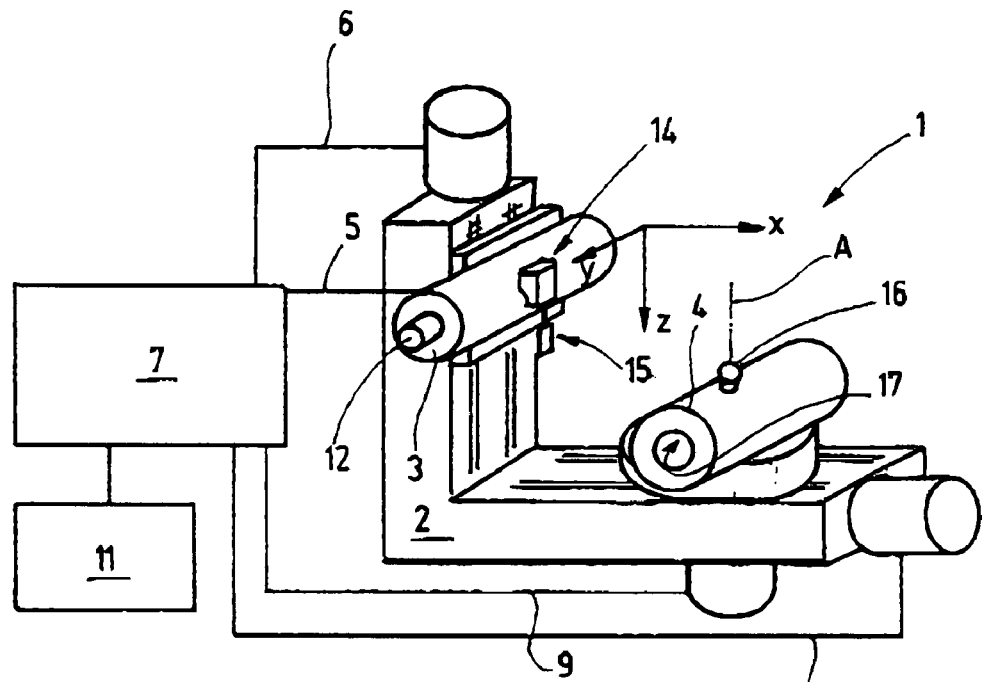
FIG. 1 shows a grinding machine or an erosion machine in an extremely schematic illustration.

A grinding machine 1 is schematically illustrated in FIG. 1, which is provided with a machine stand 2 supporting a grinder head 3 (also called a grinding spindle carrier) and a workpiece carrier 4. The grinder head 3 is mounted on a corresponding sled-type arrangement where it can be moved in two directions Y and Z. Two corresponding drives serve for adjustment of said grinder head in these two directions whereby said drives are connected to a control device 7 via a Y-control line 5 and a Z-control line 6. By "control line" is understood here to mean any information conduit, i.e. also a data bus, with which the control commands can be transmitted to the corresponding drive and whereby position signals can be transmitted back from said drive to the control device 7.

The workpiece carrier 4 is also mounted with a sled-type arrangement to the machine stand 2 so that is can be adjusted in direction X. Its X-adjustment movement is controlled by the control device 7 via an X-control line 8. In addition, it can be proposed that the workpiece carrier is mounted swivably about a vertical axis A. The swiveling movement is caused by a swivel drive that is connected to the control device 7 via an A-control line 9. The control device 7 is a control computer having access to a memory device 11, for example, which can store data and programs, and which can keep this data and programs available for access through the memory device 7.

The grinder head 3 is provided with a working spindle 12 onto which grinding tools, i.e. grinding wheels, can be attached for the machining of workpieces. The rotational axis RA of the working spindle 12 is oriented parallel to the direction Y. In addition, a machine tracer 14 is arranged on the grinder head 3 whereby said machine tracer is provided with a tracer element 15 to trace a test piece 16 that is fastened to the workpiece carrier 4. The test piece 16 is for instance a sphere mounted fixedly to the workpiece carrier 4, while the tracer element 15 is a tracer pin having a tracer plate and/or a tracer ball. The workpiece carrier 4 is provided with a receiving element 17 for a workpiece, i.e. a cylindrical unfinished piece, from which a drill bit or some other tool can be manufactured in one grinding process.

Figure 2:
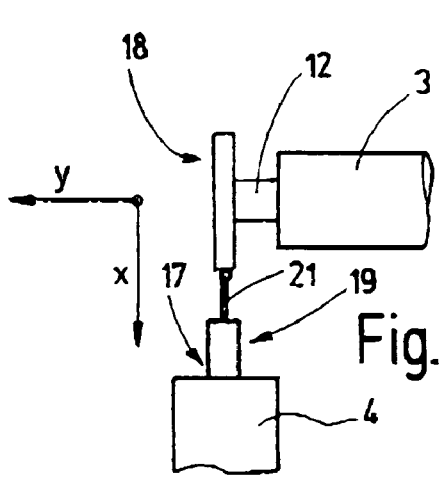
FIGS. 2 through FIG. 5 show in a schematic illustration various phases of an initial calibration process.

The so far described grinding machine 1 is calibrated as follows:

A reference body in the form of a reference disk 18, for example, is attached to the working spindle 12 of the grinder head 3 and a reference tracer 19 is attached to the workpiece receiver 17 of the workpiece carrier 4 to carry out the initial calibration as illustrated in FIG. 2. Said reference tracer is designed as a switching measuring tracer, for example. Its tracer pin 21 is laterally swivable and axially movable. It is swiveled about a pivot D in a lateral travel as indicated in FIG. 3.

After the reference disk 18 and the reference tracer 19 have been fastened to the grinder head 3 and the workpiece carrier 4, respectively, the control device causes the grinder head 3 to move in direction Z to the level of the working piece carrier 4 in the way of a calibration operation, and said control device causes the workpiece carrier 4 to be driven in the direction X toward the grinder head 3 to trace the reference disk 18 with the reference tracer 19 as illustrated in FIG. 2. For this purpose, the workpiece carrier 4 is rotated about its axis A in such a manner that the tracer pin 21 extends now along direction X. The approaching movement of the workpiece carrier 4 is stopped when the tracer has reached its switch point. The position data of the workpiece carrier 4 obtained via the X-control line 8 is computed together now with the known and stored dimension data of the reference disk 18 and the reference tracer. The expected switch point at which the reference tracer is to be activated is obtained from the dimensions of the reference tracer 19 and the reference disk 18 as well as from the X-position data. As a rule, the actual switch point deviates from that. The travel path difference $\Delta x$ is stored.

Figure 3:
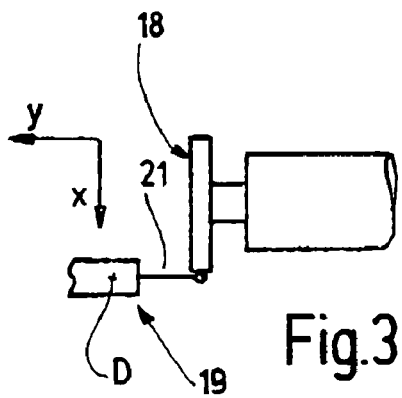

As illustrated in FIG. 3, the control device assigned to axis A is given a command via the A-control line 9 in such a manner that the reference tracer 19 and its tracer pin 21 extend parallel to the direction Y. Tracing of the reference disk 18 is performed subsequently in direction X again by triggering the drive assigned to the direction X via the X-control line 8. A $\Delta x$ value is also determined through this test whereby the position of the swiveling axis D of the tracer pin 21 in the reference tracer can be determined from comparison of the results of the two tests according to FIG. 2 and FIG. 3.

Figure 4:
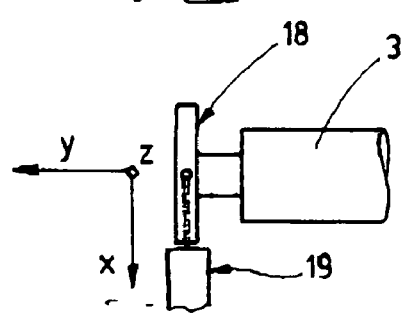
Figure 5:
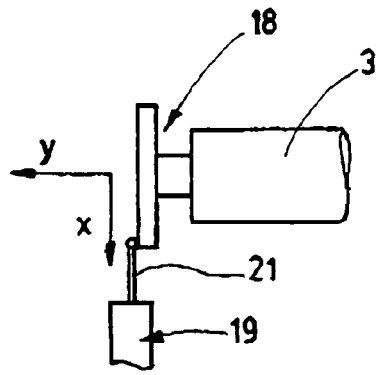

A test follows now, as illustrated in FIG. 4, in which axis Z, oriented perpendicular to the plane of the drawing in FIG. 4, is used as a tracing direction. A drive device assigned for direction Z is triggered via the Z-control line 6 in such a manner that the reference tracer 19 responds thereto. A test for direction Y is subsequently conducted according to FIG. 5. This results in the corresponding values $\Delta x$, $\Delta y$, which are then stored.

Figure 8:
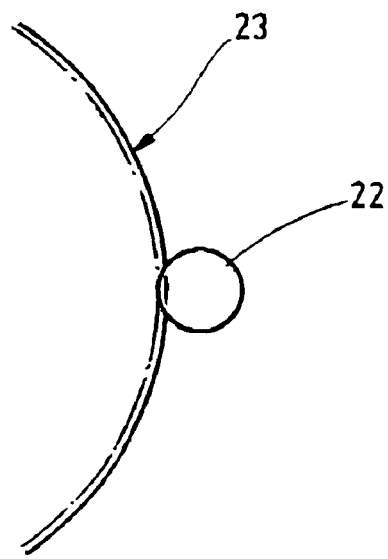
FIG. 8 shows in a schematic front view the grinding tool together with the unfinished piece according to FIG. 6 and FIG. 7.
Figure 9:
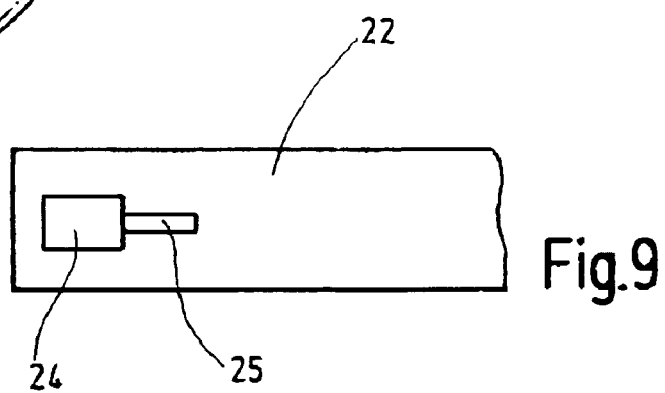
FIG. 9 shows the unfinished piece with a slightly ground section in a schematic side view in a different scale.

Directly after carrying out these tests, a series of grinding tests is always performed in the framework of the first step for the initial calibration. These tests are illustrated in FIG. 6 through FIG. 12. According to FIG. 6, a first grinding test in direction X is based on the fact that a cylindrical unfinished piece or any other piece 22 oriented in direction Y is clamped into the workpiece carrier 4 and is guided in direction X toward a grinding wheel 23 supported by the grinder head 3. A feed movement is now performed in direction X leading to a set grinding depth. A short push in direction Y completes then the grinding process to form a first facet 24 in the piece 22. The second grinding test is performed on the same piece 22 with the same grinding wheel 23, according to FIG. 7, whereby the workpiece carrier 4 is rotated 180 degrees about axis A and the piece 22 is rotated 180 degrees about its longitudinal center axis. A second facet 25 is now produced directly adjacent to first facet 24, which is illustrated in FIG. 9. The same grinding depth is the goal using the existing machine adjustment data. However, this has generally not been achieved in a first test because the correction value $\Delta x$ obtained in the above-described referencing process (as obtained according to FIG. 2 and FIG. 3) is still not precise at first. FIG. 8 illustrates how the grinding wheel 23 actually penetrates the piece 22 with different depths during the two grinding tests, according to FIG. 6 and FIG. 7, so that the facets 24, 25 are of considerably different sizes even when there is nearly no difference in grinding depth.

A necessary correction of the correction value $\Delta x$ can now be determined from the size difference of the facets 24, 25. In the simplest case, this can be performed by the operator and input into the control device 7 through an input element. However, it is also possible to measure only the size difference of the facets 24, 25, which means to measure the difference of their expansion relative to the circumferential direction of the piece 22 and to input this measurement into the control device 7. The control device 7 can in this case correct the correction value $\Delta x$ by an amount that is proportional to the size difference of the facets 24, 25.

Figure 6:
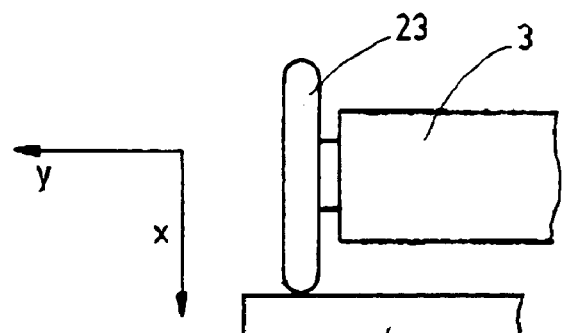
FIG. 6 and FIG. 7 show in respective schematic top views a grinder head together with a grinding tool making contact with an unfinished piece during a grinding test in various positions.
Figure 7:
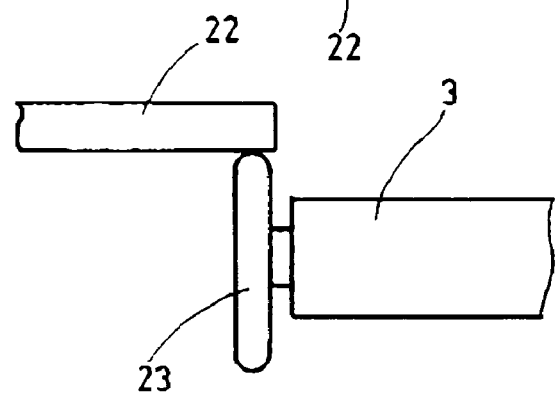

After carrying out this correction, the grinding test according to FIG. 6 and FIG. 7 and the following measuring of the facets 24, 25, as well as the correcting of the correction value $\Delta x$ is repeated until the facets 24, 25 are of equal size. Once this has been accomplished, then the additional correction value $\Delta x R$, which is iteratively determined in the grinding tests and added to the correction value $\Delta x$, can be considered as correction value of the reference tracer and be used the same way for the remaining coordinate directions Y and Z. This can be accomplished at least when the reference tracer 19 has the same switch point location in all deflection directions oriented transverse to its tracer pin 21.

While the grinding test illustrated in FIG. 6 through FIG. 9 is used for referencing the tracing processes of the reference tracer according to FIG. 3 through FIG. 5, FIG. 10 through FIG. 12 illustrate a grinding test process for referencing the reference tracer 19 during its tracing process according to FIG. 2. The test piece 22 or also another corresponding test piece is used again and it is ground this time at its face. Said test piece 22 is guided toward the grinding wheel 23 from the positive and negative direction X and is respectively ground nominally and equally deep. An X-fault can again be determined from the ground section appearing in FIG. 12 having different facets 26, 27. This fault identifies a deviation $\Delta x A$ for the axial direction of the reference tracer 19. Determination of the value $\Delta x A$ is complete when the size of the facets 26, 27 are equal whereby said facets are obtained in grinding tests carried out in an iterative manner.

After the so far performed referencing of the grinding machine 1 and the reference tracer 19, a first re-calibration of the grinding machine 1 has to be performed in which the machine tracer 14 is calibrated. This process is illustrated in FIG. 13 through FIG. 16. Re-calibration is performed by tracing the test piece 16 with the machine tracer 14 or its tracer element 15, which is designed as a cube, for example. The test piece 16 is traced thereby two times in direction X according to FIG. 13 and FIG. 14, whereby said test piece is rotated by 90 degrees about the axis A between both tests. Since an initial calibration has been performed just prior thereto with the reference tracer 19, the now obtained switch positions, at which the machine tracer 14 responds, are stored and are considered as set values. The test piece 15 is traced correspondingly in direction Y according to FIG. 15 and in direction Z according to FIG. 16 whereby the obtained switch positions are again stored as set values.

The calibration of the grinding machine is thereby completely finished. It can be placed into operation based on the existing correction values $\Delta x$, $\Delta y$, $\Delta z$, $\Delta x R$, $\Delta x A$.

Should re-calibration be required after some time, i.e. because the grinding machine experienced a change in temperature, then the re-calibration steps of FIG. 13 through FIG. 16 are repeated. If there are deviations in these four tracing tests from the data stored during the initial calibration, then the deviation from the stored value are determined and stored again. They are considered as re-calibration correction values during future positioning of the grinder head 3 or the workpiece carrier 4.

Re-calibration can be repeated as often as desired and it is performed each time by tracing the test piece 16 with the machine tracer 15 from different tracing directions. A new calibration is not required.

A new calibration or a re-calibration can be performed in a similar way on erosion machines or on combined grinding/erosion machines.

A method for calibration of grinding and/or erosion machines assumes an initial calibration process and corresponding re-calibration processes. Calibration of the machine is performed with a reference piece and a reference tracer in an initial calibration process whereby the reference piece is fastened to a working spindle or a workpiece carrier and the reference tracer is fastened to the workpiece carrier or the working spindle. Grinding tests follow the first tracing process from all directions during which tests deviations are determined and made ineffective with the iterative procedure, especially deviations based on the tolerance of the tracer, which are an integral part of the tracing process. The machine-internal measuring system is calibrated immediately after performing the machining tests and thereby immediately after the initial referencing of the machining apparatus whereby the machine tracer and a test piece is traced from all coordinate directions and the resulting position values are stored. Subsequent re-calibrations supply measured values, which are compared to the stored values whereby correction values are determined then from the deviations for additional machining of workpieces.

The invention claimed is:

1. A method for the calibration of a grinding machine or an erosion machine, or a combined grinding and erosion machine, comprising the step of:
   providing a machine including a spindle carrier, a working spindle carried by the spindle carrier for receiving a grinding tool or an erosion tool, a workpiece carrier including a receiver element for receiving a workpiece, a control mechanism for producing relative movement between the spindle carrier and the workpiece carrier, to position the spindle carrier and the workpiece carrier in different relative orientations, the control mechanism including a memory unit for storing calibration values, wherein the method further comprises the steps of:
   A) performing an initial calibration by:
      A1) providing the working spindle and the receiver element with a reference body and a reference tracer, respectively,
      A2) tracing the reference body with the reference tracer a plurality of times, with the spindle and the workpiece carrier positioned in different relative orientations for the respective tracings by actuation of the control mechanism, and
      A3) storing in the memory unit, the measured values resulting from the tracings of step A2;
   B) performing a grinding test by:
      B1) providing the working spindle and the receiver element with a grinding tool and a body, respectively, and lightly grinding the body from different directions to create respective ground sections on the body,
      B2) establishing correction values based upon a comparison of differences between the ground sections, and
      B3) adjusting the measured values of step A3 in accordance with the correction values of step B2; and thereafter
   C) performing a re-calibration of the machine by:
      C1) tracing a test piece disposed on one of the spindle carrier and the workpiece carrier by a machine tracer disposed on the other of the spindle carrier and the workpiece carrier to calibrate the machine tracer, and
      C2) storing the calibration of the machine tracer in the memory.

2. The method according to claim 1 further including making subsequent re-calibrations of the machine periodically by repeating step C.

3. The method according to claim 1 wherein a reference disk is used as the reference body.

4. The method according to claim 1 wherein a switching tracer is used as the reference tracer.

5. The method according to claim 1 wherein step A2 is performed along three separate coordinates.

6. The method according to claim 1 wherein the grinding of step B1 is performed twice in opposite respective directions along the same coordinate.

7. The method according to claim 6 wherein the two grindings in opposite directions are performed adjacent to one another on the body.

8. The method according to claim 7 wherein the correction values established in step B2 are based upon a comparison of the sizes of the ground sections.

* * * * *